(12) United States Patent
Watnik et al.

(10) Patent No.: US 7,114,087 B2
(45) Date of Patent: Sep. 26, 2006

(54) METHOD TO DETECT A TEMPERATURE CHANGE BY A THERMAL MONITOR AND COMPENSATING FOR PROCESS, VOLTAGE, TEMPERATURE EFFECTS CAUSED BY THE TEMPERATURE CHANGE

(75) Inventors: Christine Watnik, Gold River, CA (US); Zohar Bogin, Folsom, CA (US); Buderya "Satish" Acharya, El Dorado Hills, CA (US); Romesh Trivedi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 446 days.

(21) Appl. No.: 10/446,549

(22) Filed: May 27, 2003

(65) Prior Publication Data

US 2004/0243857 A1 Dec. 2, 2004

(51) Int. Cl.
*G06F 1/26* (2006.01)

(52) U.S. Cl. ............... 713/320; 713/320; 713/324; 713/340

(58) Field of Classification Search ............... 713/300, 713/320, 324, 330, 340
See application file for complete search history.

(56) References Cited

U.S. PATENT DOCUMENTS

| 4,498,141 | A | * | 2/1985 | Cooper | 708/212 |
| 5,134,398 | A | * | 7/1992 | Yasutake et al. | 341/119 |
| 6,373,841 | B1 | * | 4/2002 | Goh et al. | 370/389 |
| 6,415,388 | B1 | * | 7/2002 | Browning et al. | 713/322 |
| 6,426,570 | B1 | * | 7/2002 | Nerone | 307/10.8 |
| 6,728,653 | B1 | * | 4/2004 | Figueredo | 702/117 |
| 6,888,388 | B1 | * | 5/2005 | Cook et al. | 327/170 |
| 6,987,399 | B1 | * | 1/2006 | Lee | 324/760 |
| 2003/0094987 | A1 | * | 5/2003 | Mandal et al. | 327/276 |
| 2004/0037346 | A1 | * | 2/2004 | Rusu et al. | 374/121 |
| 2004/0104709 | A1 | * | 6/2004 | Yamaji et al. | 320/150 |
| 2005/0146307 | A1 | * | 7/2005 | Dooley et al. | 322/28 |

* cited by examiner

*Primary Examiner*—Chun Cao
*Assistant Examiner*—Malcolm Cribbs
(74) *Attorney, Agent, or Firm*—Blakely, Sokoloff, Taylor & Zafman LLP

(57) ABSTRACT

According to one embodiment, computer system is disclosed. The computer system includes a central processing unit (CPU), a bus coupled to the CPU and a chipset coupled to the bus. The chipset includes compensation circuitry to compensate for process, voltage and temperature (PVT) effects attributed to a voltage change on the bus.

26 Claims, 6 Drawing Sheets

METHOD TO DETECT A TEMPERATURE CHANGE BY A THERMAL MONITOR AND COMPENSATING FOR PROCESS, VOLTAGE, TEMPERATURE EFFECTS CAUSED BY THE TEMPERATURE CHANGE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to computer systems; more particularly, the present invention relates to performing resistive/impedance compensation at components within a computer system.

BACKGROUND

Throughout the history of microcomputers there has been a motivation to increase the performance of microprocessors. However, with the constant increase in microprocessor performance, there is typically an increase in the magnitude of power consumed by the microprocessor. Due to the increase in power consumption, the run time temperature of the die of a microprocessor may exceed a safe threshold value.

Currently, thermal sensors are being added to microprocessors to monitor temperature. The temperature sensor transmits a signal in response to detecting a temperature that exceeds a predetermined threshold value. In response, the voltage on a processor bus coupled to the microprocessor is changed.

A chipset coupled to the microprocessor via the processor bus typically includes an impedance compensation circuit to compensate for process/voltage/temperature effects. However, current compensation circuits are incapable of compensating for effects attributed to the voltage change on the processor bus in response to the detection of an excessive temperature at a microprocessor.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A resistive/impedance compensation (RCOMP) mechanism is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
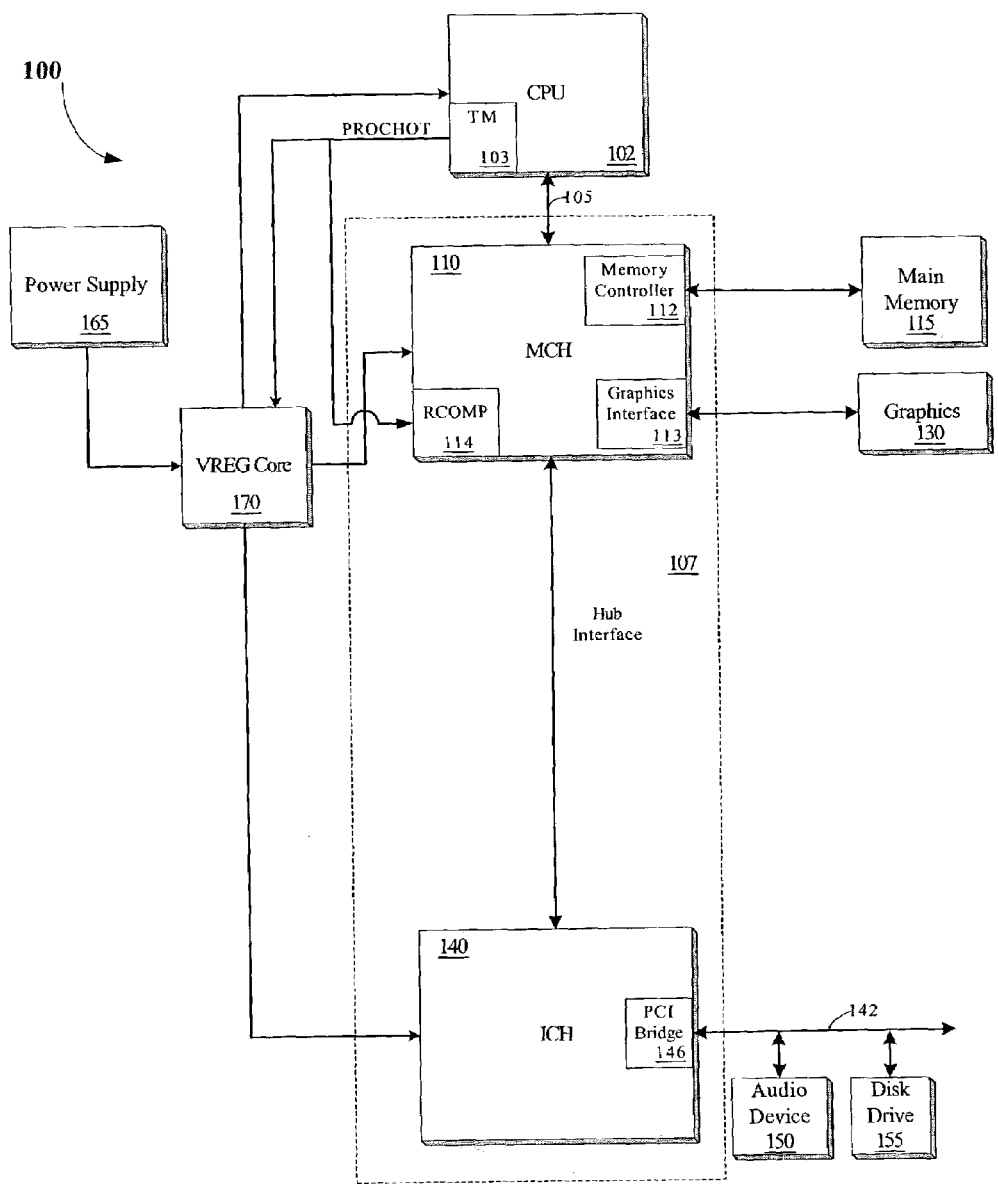
FIG. 1 is a block diagram of one embodiment of a computer system.

FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

A chipset 107 is also coupled to bus 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to bus 105, such as multiple CPUs and/or multiple system memories.

MCH 110 may also include a graphics interface 113 coupled to a graphics accelerator 130. In one embodiment, graphics interface 113 is coupled to graphics accelerator 130 via an accelerated graphics port (AGP) that operates according to an AGP Specification Revision 2.0 interface developed by Intel Corporation of Santa Clara, Calif.

According to one embodiment, MCH 100 includes a RCOMP module 114. RCOMP module 114 performs resistance and impedance strength evaluations to enable MCH 110 to interface with bus 105. Particularly, RCOMP module 114 compensates for process, voltage and temperature (PVT) effects by adjusting transistor strength to meet a predetermined target. The operation of RCOMP module 114 will be described in greater detail below.

In one embodiment, MCH 110 is coupled to an input/output control hub (ICH) 140 via a hub interface. ICH 140 provides an interface to input/output (I/O) devices within computer system 100. ICH 140 may be coupled to a Peripheral Component Interconnect bus adhering to a Specification Revision 2.1 bus developed by the PCI Special Interest Group of Portland, Oreg. Thus, ICH 140 includes a PCI bridge 146 that provides an interface to a PCI bus 142. PCI bridge 146 provides a data path between CPU 102 and peripheral devices.

PCI bus 142 includes an audio device 150 and a disk drive 155. However, one of ordinary skill in the art will appreciate that other devices may be coupled to PCI bus 142. In addition, one of ordinary skill in the art will recognize that CPU 102 and MCH 110 could be combined to form a single chip. Further graphics accelerator 130 may be included within MCH 110 in other embodiments.

In addition, computer system 100 includes a power supply 165 and a multitude voltage regulator 170. Voltage regulator module (VREG) 170 provides voltage to CPU 102, MCH 110 and ICH 140. In one embodiment, VREG core 170 provides a 1.5V supply voltage.

According to one embodiment, processor 102 includes a thermal monitor (TM) 103. TM 103 is a thermal sensor that detects the heat generated by processor 102. In one embodiment, TM 103 asserts a signal (e.g., to logic 0) PROCHOT whenever a detected thermal value exceeds a predetermined threshold. Similarly, the PROCHOT signal is de-asserted (e.g., to logic 1) when the value goes below the predetermined thermal threshold.

The PROCHOT signal is received at voltage regulator 170. Therefore, if TM 103 is enabled within processor 102, PROCHOT asserted and voltage regulator 170 reduces the voltage to processor 102 and on bus 105 (e.g., by changing the voltage id code and VID code at bus 105). This change in voltage is not recognized at MCH 110.

The voltage changes at some rate and remains at a low level as long as PROCHOT remains asserted. Once TM 103 indicates that processor 102 has sufficiently cooled down, TM 103 de-asserts the PROCHOT signal. Consequently, voltage regulator 170 ramps the voltage back up to the normal operating voltage. As described above, MCH 110 is not aware of these changes. Thus, MCH could have problems interfacing with bus 105 due to PVT effects attributed to the voltage change.

In one embodiment, RCOMP module 114 also compensates for voltage changes at bus 105. In a further embodiment, RCOMP module 114 receives the PROCHOT signal. RCOMP module 114 monitors the PROCHOT signal and generates a signal (tm_mode) depending upon the status of the PROCHOT signal. The tm_mode signal is an internal signal that is used to indicate that the voltage is changing on bus 105.

Figure 2:
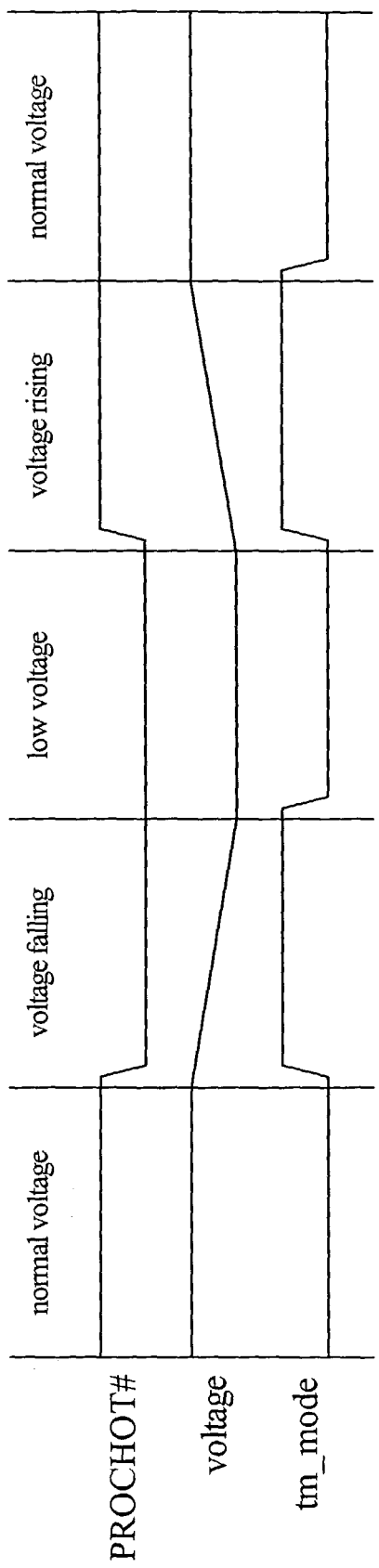
FIG. 2 is a timing diagram illustrating the performance of a thermal monitor.

FIG. 2 is a timing diagram illustrating the generation of the tm_mode signal during the operation of TM 103. According to one embodiment, the tm_mode signal is activated whenever the value of the PROCHOT signal changes. For example, the tm_mode signal is activated when the PROCHOT signal is asserted. The tm_mode signal is de-activated after the PROCHOT signal has been asserted for a predetermined time period. The tm_mode signal is again activated when the PROCHOT signal is de-asserted.

Figure 3:
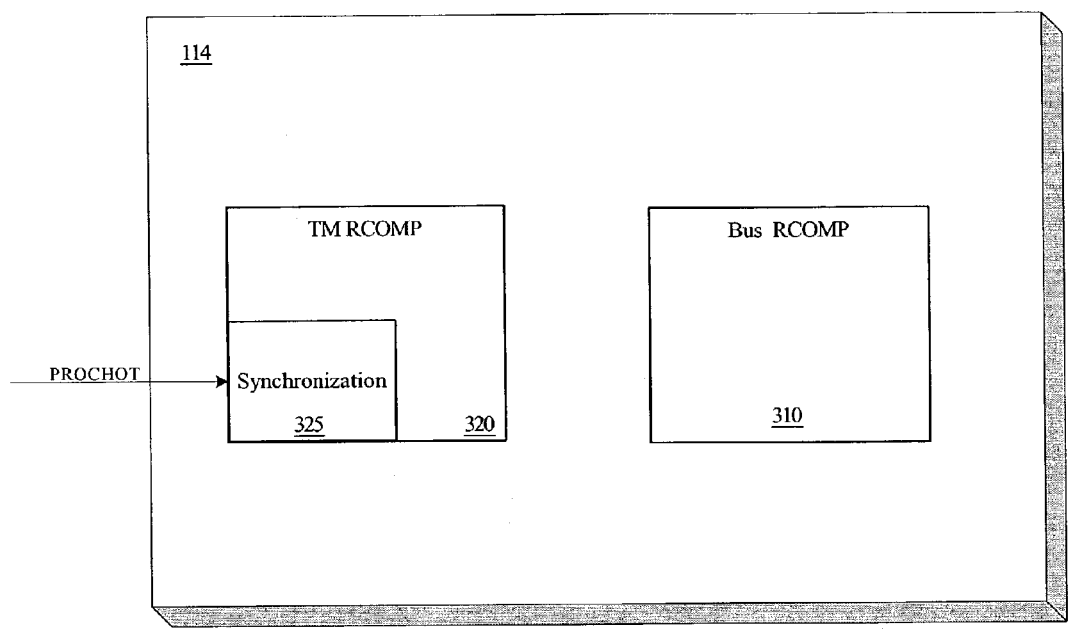
FIG. 3 is a block diagram of one embodiment of a resistive/impedance compensation (RCOMP) module.

FIG. 3 is a block diagram of one embodiment of RCOMP module 114. RCOMP module 114 includes bus RCOMP module 310 and TM RCOMP module 320. Bus RCOMP module 310 controls the typical resistance and impedance strength evaluations to enable MCH 110 to interface with bus 105. TM RCOMP module 320 controls the evaluations attributed to voltage changes caused by TM 103.

During the normal mode of operation (e.g., when the voltage is not changing), evaluations are performed infrequently (e.g., once every 125 ms) at bus RCOMP module 310. Thus, calibration logic within bus RCOMP module 310 (not shown) allows sufficient time for the possibility that the entire range of strengths must be traversed. In one embodiment, MCH brings the bus 105 to an idle condition after new strengths are calculated and before the strengths are used. This ensures signal integrity while the strengths are transitioning.

In one embodiment, TM RCOMP module 320 is in control whenever RCOMP module 114 detects that the voltage is changing (e.g., the TM RCOMP mode). During the TM RCOMP mode, evaluations occur continuously. In one embodiment, the TM RCOMP mode is independent of the normal RCOMP mode.

Figure 6:
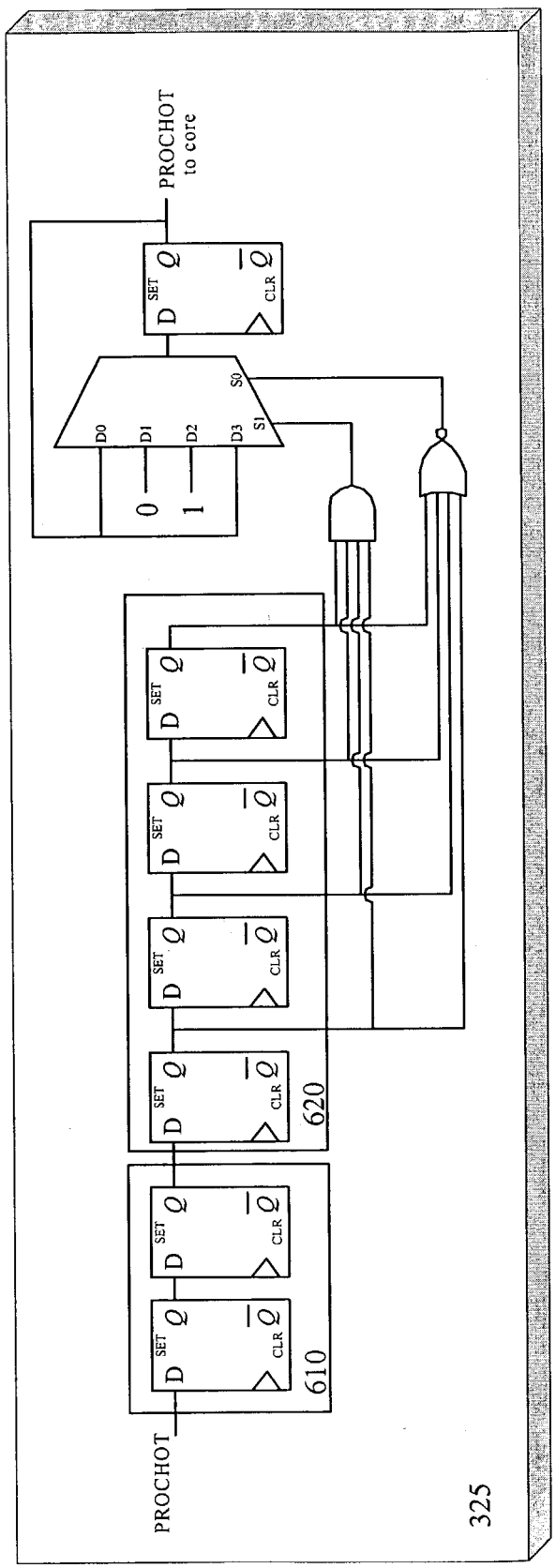
FIG. 6 is a block diagram of one embodiment of a synchronization circuit.

To ensure that the PROCHOT signal is sampled and used correctly by the core, the PROCHOT signal is first synchronized into the MCH 110 clock domain. FIG. 6 is a block diagram of one embodiment of a synchronization circuit 325. Synchronization circuit 325 includes synchronizer 610, filter 620, an and-gate, a nor-gate and a multiplexer.

Because the PROCHOT signal is asynchronous relative to the MCH 110 clock domain, two flip-flops within synchronizer 610 are included to synchronize the signal. In addition, the PROCHOT signal is based on analog circuitry generated at processor 102. Therefore, the signal may vary before settling at a high or low logic value. Filter 620 provides a stable value for the PROCHOT signal before the signal is analyzed.

In one embodiment, a four-clock filter is used to enable the signal to stabilize before the value is read. Accordingly, the version of PROCHOT read by the MCH 110 core will only change values when the four filter flops all read the same new value. One of ordinary skill in the art will appreciate that other quantities of flip-flops may be implemented within synchronizer 610 and/or filter 620 without departing from the scope of the invention Referring back to FIG. 3, in one embodiment when a normal RCOMP evaluation takes place on bus 105, evaluation also takes place on other interfaces of MCH 110 (e.g., the hub interface to ICH 140). Evaluation logic (not shown) is responsible for synchronizing an RCOMP event among these various interfaces. When the voltage is changing on bus 105 the normal RCOMP evaluation is not conducted. However, synchronization occurs. Moreover, if a normal RCOMP evaluation is in progress when a voltage change is detected, the normal RCOMP evaluation immediately exited (e.g., which has a long evaluation period) and the faster, continuous TM RCOMP mode evaluations take place.

Figure 4:
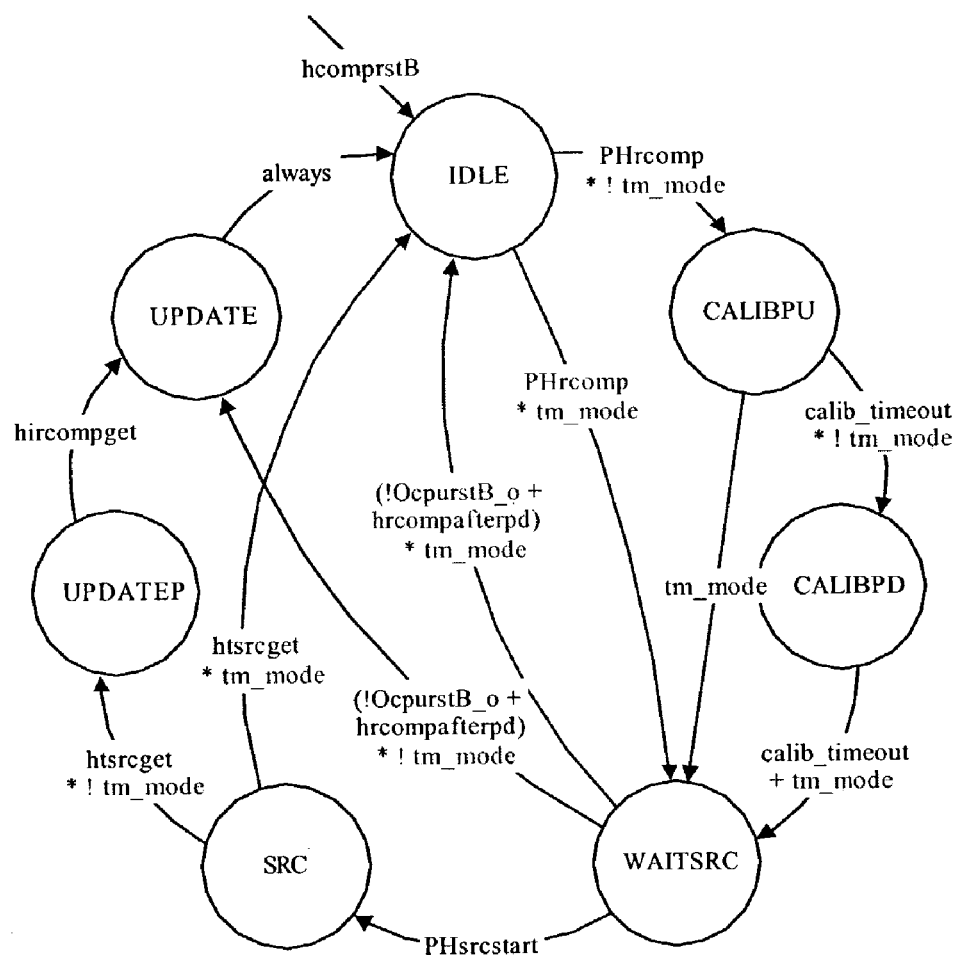
FIG. 4 illustrates one embodiment of a bus RCOMP state machine.

FIG. 4 illustrates one embodiment of a bus RCOMP 310 state machine. The state machine begins in an IDLE state. Evaluation (calibration) begins when a PHrcomp signal is received. In one embodiment, this signal is received from a RCOMP control state machine (not shown). First the pull-up strength is evaluated (CALIBPU), followed by the pull-down strength (CALIBPD).

If this is the first RCOMP sequence following reset, HMCOMP then immediately updates the strengths sent to the I/O buffers. Otherwise, HMCOMP waits for another signal from the global RCOMP state machine (PHsrcstart) to assert, sends the synchronization cycle to the other interfaces of the MCH (SRC state), asserts BPRI# and waits for BUS 105 to become idle (UPDATEP state), and finally updates the strengths sent to the I/O buffers.

In addition, the bus RCOMP 310 state machine is aware of the TM RCOMP mode. In one embodiment, if the state machine is in one of the calibration states when PROCHOT asserts or de-asserts, the calibration is immediately halted. The state machine communicates with the other units as usual, and then skips buffer update steps.

Figure 5:
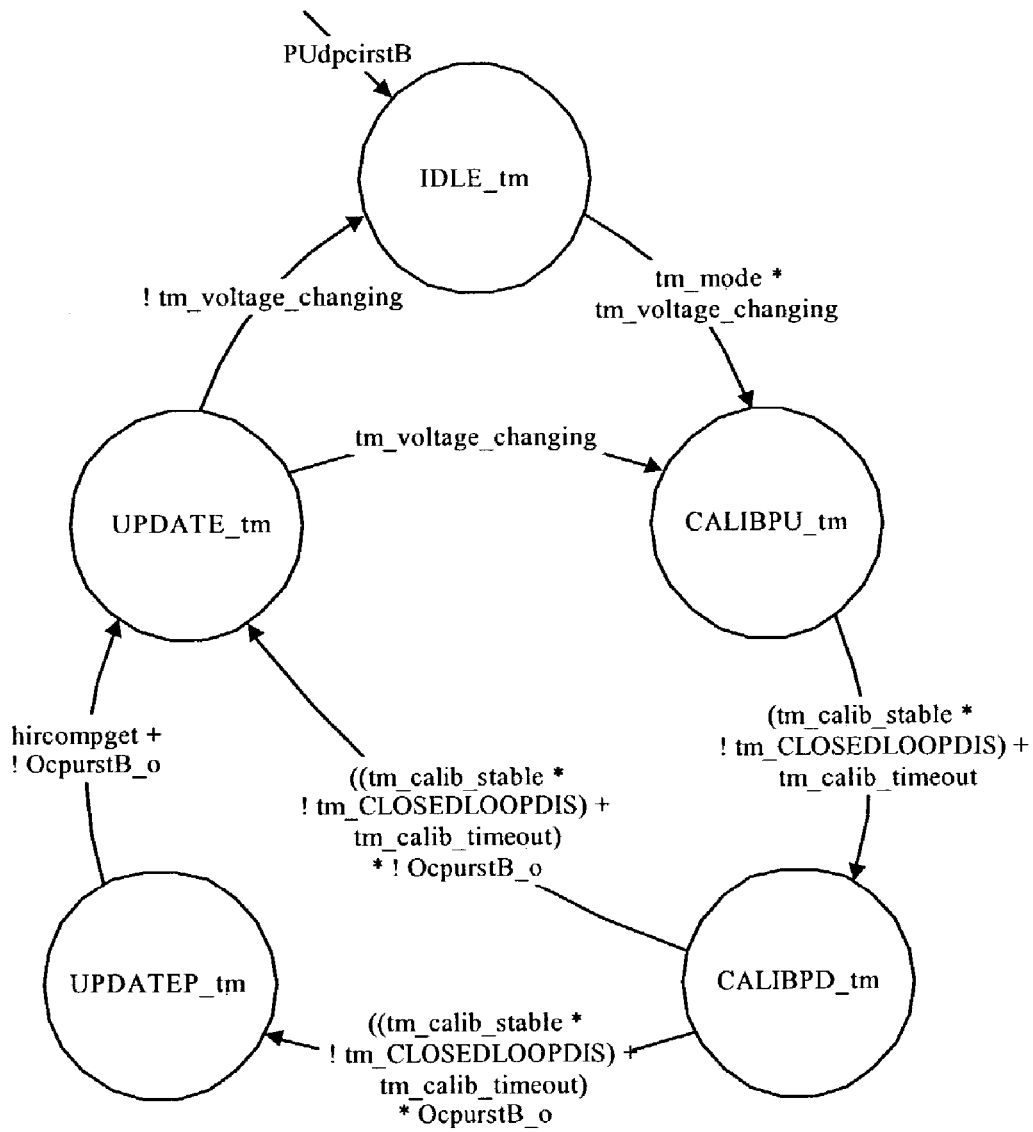
FIG. 5 illustrates one embodiment of a thermal monitor RCOMP state machine.

FIG. 5 illustrates one embodiment of a TM RCOMP 320 state machine. The TM RCOMP 320 state machine goes through a similar set of states as the bus RCOMP 310 state machine. However, there is no communication via the SRC cycle to other interfaces. In one embodiment, bus 105 is the only interface to go through a special RCOMP sequence as a result of TM 2 since bus 105 is the only interface affected by a voltage change.

According to one embodiment, the calibration phases in both the bus RCOMP and TM RCOMP state machines involve sending a strength value to a RCOMP buffer within RCOMP module 114 (not shown). The RCOMP buffer drives a pin and samples it back. Based on how this sampled signal compares with a reference voltage, the RCOMP buffers transmits a signal back to the MCH 110 core indicating whether the strength should be incremented or decremented. In a further embodiment, each of the calibration states in the normal state machine is long enough to allow for the possibility that the entire range of strength values are to be tested.

In yet a further embodiment, the number of samples in the TM RCOMP 320 state machine is programmable via configuration registers so that it is much quicker than in normal mode. In a further embodiment, a closed-loop mode is included to detect when the strength is accurate for the current voltage. This feature detects when the last X number of samples include X/2 increment indications and X/2 decrement indications. In this case the current calibration state is exited and the current strength is assumed to be accurate. Thus, the TM RCOMP 320 state machine is able to perform updates as frequently as possible to keep the strengths as accurate as possible to avoid corruption of signals transmitted by MCH 110 on bus 105.

According to one embodiment, the TM RCOMP state machine 320 and associated logic include other variables that can also be programmed. For instance, the time that MCH 110 assumes the voltage will be falling following the assertion of PROCHOT is programmable. In addition, the time that MCH 110 assumes the voltage will be rising following the de-assertion of PROCHOT is programmable. In another embodiment, the closed-loop mode can be disabled as well as TM RCOMP mode itself. There may also be an override mode (for both rising and falling voltage) where the strengths can be changed by a fixed value every specified amount of time.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A computer system comprising:
   a central processing unit (CPU);
   a bus coupled to the CPU; and
   a chipset, coupled to the bus, comprising compensation circuitry to compensate for process, voltage and temperature (PVT) effects attribute to a voltage change on the bus caused by a thermal change at the CPU by evaluating a pull-up strength of resistors within the chipset, evaluating a pull-down strength of resistors within the chipset and receiving a synchronization signal.

2. The computer system of claim 1 wherein the CPU comprises a thermal sensor to monitor the heat generated by the CPU.

3. The computer system of claim 2 wherein the CPU transmits a signal whenever the thermal sensor detects a temperature that exceeds a predetermined threshold.

4. The computer system of claim 3 further comprising a voltage regulator coupled to the CPU and the chipset, wherein the voltage regulator reduces the voltage to the CPU and the chipset upon receiving the signal from the CPU.

5. The computer system of claim 3 wherein the compensation circuitry comprises:
   a bus compensation component to control resistance and impedance strength evaluations attributed to conventional PVT effects; and
   a thermal compensation component control resistance and impedance strength evaluations attributed to PVT effects caused by a voltage change at the bus.

6. The computer system of claim 5 wherein the thermal compensation component comprises a synchronization circuit.

7. The computer system of claim 6 wherein the synchronization circuit comprises:
   a synchronization component to synchronize the signal; and
   a filter component to provide a stable value for the signal.

8. A method comprising:
   performing resistance/inductance compensation (RCOMP) at an intergrated circuit according to a first RCOMP mode, including;
      evaluating a pull-up strength of resistors within the intergrated circuit;
      evaluating a pull-down stength of resistors within the intergrated circuit; and
      recieving a synchronization signal;
   receiving a signal at the intergrated indicating a change in temperature at a second intergrated circuit;
   changing operation at trhe intergrated circuit from a first voltage level to a second voltage level; and
   performing RCOMP at the intergrated circuit according to a second RCOMP mode in response to detecting the voltage change.

9. The method of claim 8 further comprising:
   detecting a change at the integrated circuit from the second voltage level back to the first voltage level; and
   performing RCOMP at the integrated circuit according to the first RCOMP mode in response to detecting the voltage change.

10. The method of claim 8 wherein performing RCOMP according to the first RCOMP mode comprises:
    broadcasting the synchronization signal to devices coupled to the intergrated circuit; and
    updating the strengths of input/output buffers within the intergrated circuit.

11. The method of claim 10 wherein performing RCOMP according to the second RCOMP mode further comprises:
    receiving a signal;
    evaluating a pull-up strength of resistors within the integrated circuit;
    evaluating a pull-down strength of resistors within the integrated circuit; and
    updating the strengths of input/output buffers within the integrated circuit.

12. A computer system comprising:
    a first integrated circuit (IC);
    a bus coupled to the first IC; and
    a second IC, coupled to the bus, comprising compensation circuitry to compensate for process, voltage and temperature (PVT) effects attributed to a voltage change on the bus caused athermal change at the first IC by evaluating a pull-up strength of resistors, evaluating a pull-down strength of resistors and a synchronization signal.

13. The computer system of claim 12 wherein the first IC comprises a thermal sensor to monitor the heat generated by the first IC.

14. The computer system of claim 13 wherein the first IC transmits a signal whenever the thermal sensor detects a temperature that exceeds a predetermined threshold.

15. The computer system of claim 14 wherein the compensation circuitry comprises:
a bus compensation component to control resistance and impedance strength evaluations attributed to conventional PVT effects; and
a thermal compensation component control resistance and impedance strength evaluations attributed to PVT effects caused by a voltage change at the bus.

16. The computer system of claim 15 wherein the thermal compensation component comprises a synchronization circuit.

17. The computer system of claim 16 wherein the synchronization circuit comprises:
a synchronization component to synchronize the signal; and
a filter component to provide a stable value for the signal.

18. An integrated circuit (IC) comprising:
comprising compensation circuitry including:
a bus compensation component to control resistance and impedance strength evaluations attributed to conventional process, voltage and temperature (PVT) effects; and
a thermal compensation component control resistance and impedance strength evaluations attributed to PVT effects caused by a voltage change at the bus caused by a thermal changeat a CPU by evaluating a pull-up strength of resistors, evaluating a pull-down strength of resistors and receiving a synchronization circuit.

19. The IC of claim 18 wherein the thermal compensation component comprises a synchronization circuit.

20. The IC of claim 19 wherein the synchronization circuit comprises:
a synchronization component to synchronize the signal; and
a filter component to provide a stable value for the signal.

21. A computer system comprising:
a central processing unit (CPU);
a bus coupled to the CPU;
a memory control hub (MCH), coupled to the bus, comprising compensation circuitry to compensate for process, voltage and temperature (PVT) effects attributed to a voltage change on the bus caused by a thermal change at the CPU by evaluating pull-up strength of resistors, evaluating a pull-down strength of resistors and receiving a synchronization signal; and
a graphics controller coupled to the MCH.

22. The computer system of claim 21 further comprising an input/output control hub (ICH) coupled to the MCH.

23. The computer system of claim 21 wherein the CPU comprises a thermal sensor to monitor the heat generated by the CPU.

24. The computer system of claim 23 wherein the CPU transmits a signal whenever the thermal sensor detects a temperature that exceeds a predetermined threshold.

25. The computer system of claim 24 further comprising a voltage regulator coupled to the CPU and the MCH, wherein the voltage regulator reduces the voltage to the CPU and the MCH upon receiving the signal from the CPU.

26. The computer system of claim 23 wherein the compensation circuitry comprises:
a bus compensation component to control resistance and impedance strength evaluations attributed to conventional PVT effects; and
a thermal compensation component control resistance and impedance strength evaluations attributed to PVT effects caused by a voltage change at the bus.

* * * * *

UNITED STATES PATENT AND TRADEMARK OFFICE
CERTIFICATE OF CORRECTION

PATENT NO.        : 7,114,087 B2
APPLICATION NO.   : 10/446549
DATED             : September 26, 2006
INVENTOR(S)       : Watnik et al.

It is certified that error appears in the above-identified patent and that said Letters Patent is hereby corrected as shown below:

In column 6, at line 21, delete "inductance" and insert --impedance--.
In column 6, at line 31, delete "trhe" and insert --the--.
In column 6, at line 64, delete "athermal" and insert --a thermal--.
In column 7, at line 32, delete "changeat" and insert --change at--.
In column 7, at line 35, delete "circuit" and insert --signal--.
In column 8, at line 12, after "evaluating" insert --a--.

Signed and Sealed this

Sixth Day of November, 2007

JON W. DUDAS
*Director of the United States Patent and Trademark Office*